Patented May 26, 1936

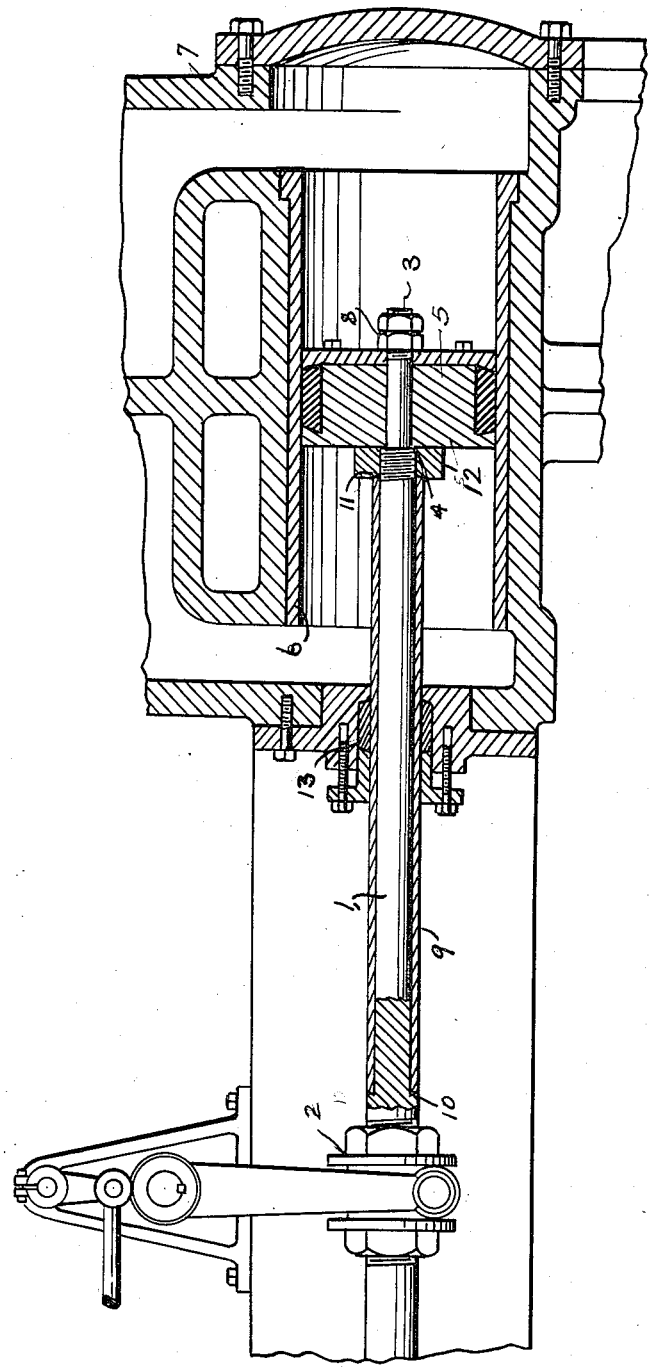

2,042,078

REISSUED

UNITED STATES PATENT OFFICE 2,042,078

PUMP ROD ASSEMBLY

Charles E. Suhm and Leo S. Ankenbruck, Houston, Tex., assignors of one-fourth to Antoine Cossette and one-fourth to Paul J. Hesse, both of Harris County, Tex.

Application July 20, 1934, Serial No. 736,164

1 Claim. (Cl. 74—579)

This invention relates to a pump rod assembly.

An object of the invention is to provide a pump rod having a removable sleeve thereon and secured thereto in a novel manner and through which the piston of a pump may be connected to the power.

The pump rod assembly is specially designed for use on slush pumps or pumps handling gritty fluid, although the rod assembly is capable of general use.

Another object of the invention is to provide a rod of the character described having a sleeve thereon which is readily removable for replacement when the sleeve becomes worn whereby it is only necessary to replace the sleeve in case of wear and which will protect the rod proper from wear.

Another object of the invention is to provide a pump assembly of such construction that it may be readily connected to the pump piston.

With the above and other objects in view, the invention has particular relation to certain novel features of construction, arrangement of parts and use, an example of which is given in this specification, and illustrated in the accompanying drawing, wherein:

The figure shows a fragmentary sectional view of a slush pump showing the rod assembly partly in section.

Referring more particularly to the drawing, the numeral 1 designates the rod proper one end of which is connected to the operating cross head 2 and whose other end as 3 is reduced forming an external annular shoulder 4. The reduced end of the rod is fitted through a central bearing in the piston 5 which works in the cylinder 6 of the slush pump 7. The shoulder 4 abuts the piston on one side and screwed onto the end of the reduced portion 3 are the nuts 8 which abut the piston on the other side, and secure said rod to the piston.

Fitted over the rod 1 is the removable sleeve 9 whose ends are tapered. One end of the sleeve 9 is fitted into an undercut groove in the annular shoulder 10, adjacent one end of the rod 1 and the other end of the sleeve fits into an undercut groove 11 in the adjacent side of the nut 12. This nut is screwed on to the rod 1 between the corresponding end of the sleeve 9 and the piston 5 and abuts also against said piston. During the operation of the pump the pump rod assembly operates through the stuffing box 13 and the sleeve 9 is subjected to considerable wear, particularly when gritty fluids are being pumped. In case of wear when it becomes necessary to replace the sleeve 9, the piston and nut 12 may be removed and the sleeve 9 readily slipped off of the rod 1 and a new one substituted for it and the nut 12 and piston 5 may then be replaced. In this manner, the rod 1 may be used for an indefinite length of time without replacement.

The drawing and description disclose what is now considered to be a preferred form of the invention by way of illustration only, while the broad principle of the invention will be defined by the appended claim.

What we claim is:

A pump rod assembly comprising a rod, one end of which is reduced to be fitted through a piston, said rod having an abutment formed by reduction of said end, a nut screwed onto said rod, one end of which has an undercut groove and whose other end is approximately flush with said abutment so as to bear against said piston, a sleeve on the rod of less diameter than the nut and one end of which is tapered to fit into said groove, an annular shoulder on the rod adjacent the other end of the sleeve and formed with an undercut groove, the end of said sleeve adjacent said last mentioned groove being tapered to fit into said groove.

CHARLES E. SUHM.
LEO S. ANKENBRUCK.